Figure 1:
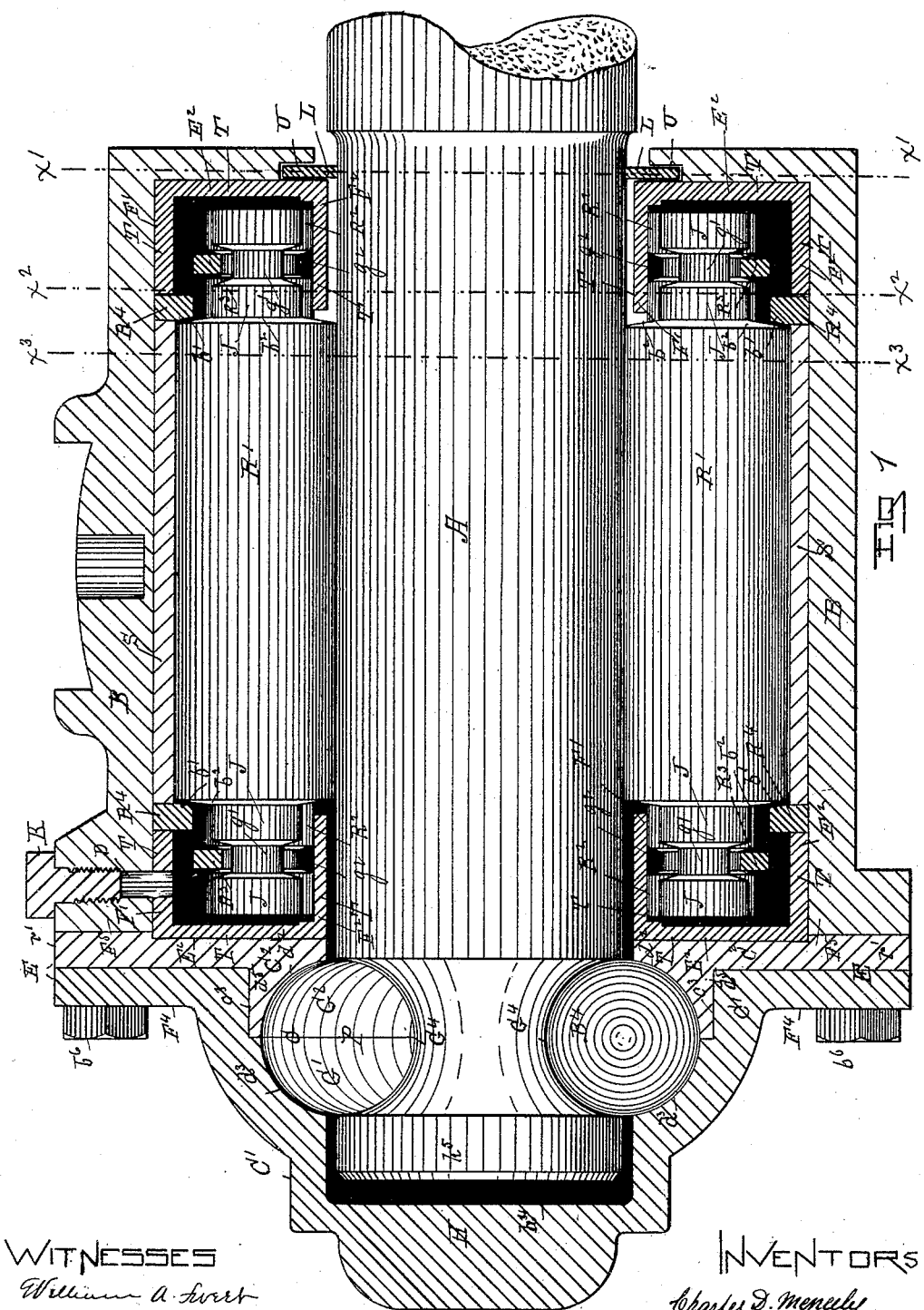

(No Model.) 5 Sheets—Sheet 1.

C. D. MENEELY & J. GIBBONS.
ROLLER BEARING.

No. 445,679. Patented Feb. 3, 1891.

Witnesses
William A. Evert
Charles S. Brintnall

Inventors
Charles D. Meneely
John Gibbons
by W. E. Hagan atty (No Model.) 5 Sheets—Sheet 2.

C. D. MENEELY & J. GIBBONS.
ROLLER BEARING.

No. 445,679. Patented Feb. 3, 1891.

(No Model.) 5 Sheets—Sheet 3.
C. D. MENEELY & J. GIBBONS.
ROLLER BEARING.

No. 445,679. Patented Feb. 3, 1891.

(No Model.) 5 Sheets—Sheet 4.

C. D. MENEELY & J. GIBBONS.
ROLLER BEARING.

No. 445,679. Patented Feb. 3, 1891.

WITNESSES
William A. Svert
[signature]

INVENTORS
Charles D. Meneely
John Gibbons by
W E Hagan atty (No Model.) 5 Sheets—Sheet 5.

C. D. MENEELY & J. GIBBONS.
ROLLER BEARING.

No. 445,679. Patented Feb. 3, 1891.

WITNESSES
William A. Sweet
Charles S. Brintnall

INVENTORS
Charles D. Meneely
John Gibbons by
W E Hagan atty

UNITED STATES PATENT OFFICE.

CHARLES D. MENEELY, OF ALBANY, AND JOHN GIBBONS, OF WEST TROY, ASSIGNORS TO THE MENEELY HARDWARE COMPANY, OF WEST TROY, NEW YORK.

ROLLER-BEARING.

SPECIFICATION forming part of Letters Patent No. 445,679, dated February 3, 1891.

Application filed August 28, 1890. Serial No. 363,337. (No model.)

*To all whom it may concern:*

Be it known that we, CHARLES D. MENEELY, of the city of Albany, county of Albany, and State of New York, and JOHN GIBBONS, of the village of West Troy, same county and State, have invented a new and useful Improvement in Roller-Bearings, of which the following is a specification.

Our invention relates to improvements in bearing-boxes for roller-bearings, and more particularly to the roller-bearings described and shown in Letters Patent granted to us, the undersigned, dated April 2, 1889, No. 400,471; and the object and purpose of our improvement are to better adapt the bearing-boxes of this class to the uses for which they are designed.

As shown in our older Letters Patent before named, the rollers are made with journaled ends that are smaller in diameter than where the rollers engage with the bearing-box and axle, the journal upon each end of the rollers being made with an annular groove, with a separator-roller arranged between the journal ends of each two of the rollers proper, said separators being also made with an encircling groove, a ring encircling the journal ends of the rollers and separators, so as to move in the grooves thereof, an inside track encircling but not in contact with the axle on which the separators run, a sleeve encircling the interior of the bearing-box between the inner face of the latter and the rollers, and with the bearing-box constructed with a two-part end cap that is annularly grooved to encircle an end-thrust ball.

Our improvements upon the bearing-box shown in said Letters Patent relate to a manner of making the sleeve which encircles the interior of the bearing-box between the latter and the rollers for adapting said sleeve to allow of the insertion of a sleeve-ring at each end of the sleeve, so that said rings will abut against the ends of the sleeve thereat, and therefrom project inwardly beyond the inner edge of the sleeve, so as to subtend the ends of the rollers where engaging with the sleeve, and so that said rings will each be over but not in contact with the roller-journal at each end thereof.

Our improvements also relate to the construction of the inside track on which the separators run, and by which improvement the inside track at the outer end of the axle is made separate from the inner part of the two-part cap, and at the inner end is made at its upper edge to abut against the bearing-ring thereat; and our invention also relates to an improved method of making and attaching the two-part end cap which contains the annular groove and end-thrust ball.

Accompanying this specification to form a part of it there are five plates of drawings containing five figures illustrating our invention, with the same designation of parts by letter reference used in all of them.

Figure 2:
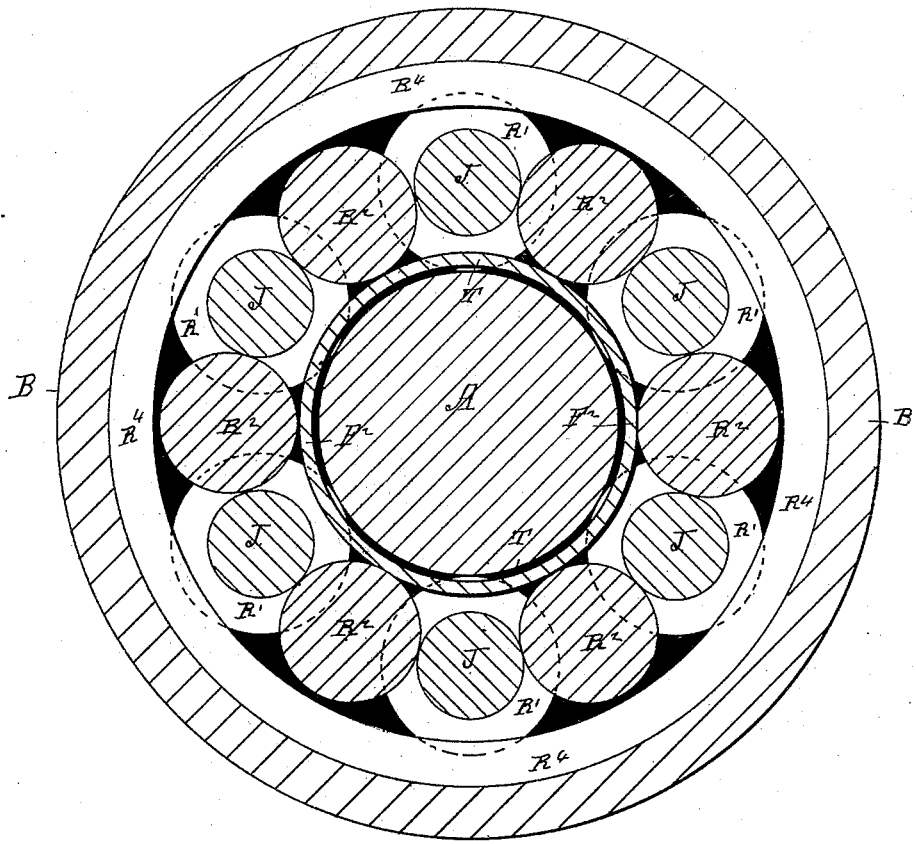
Figure 3:
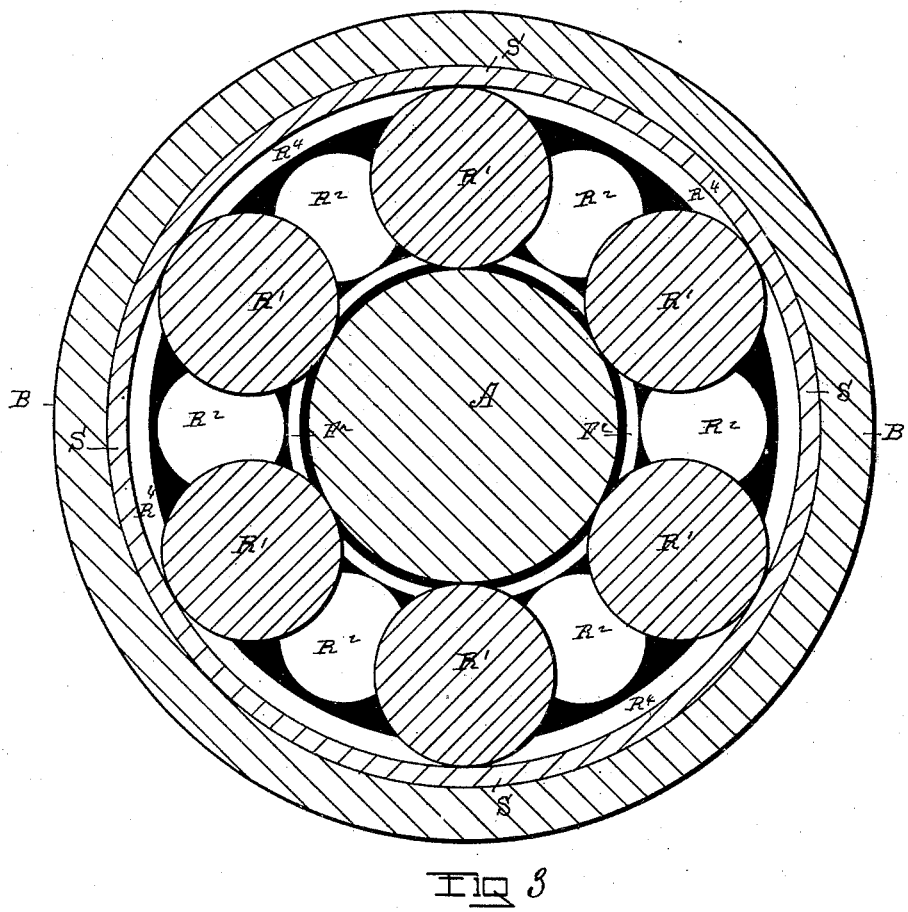
Figure 4:
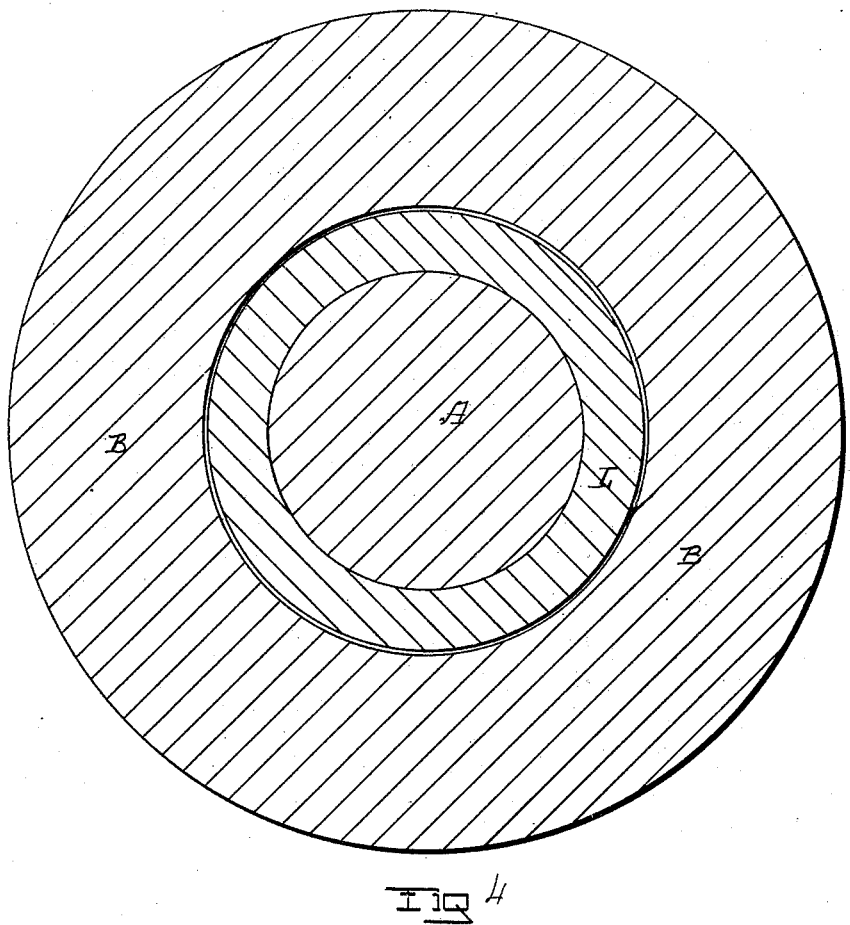
Figure 5:
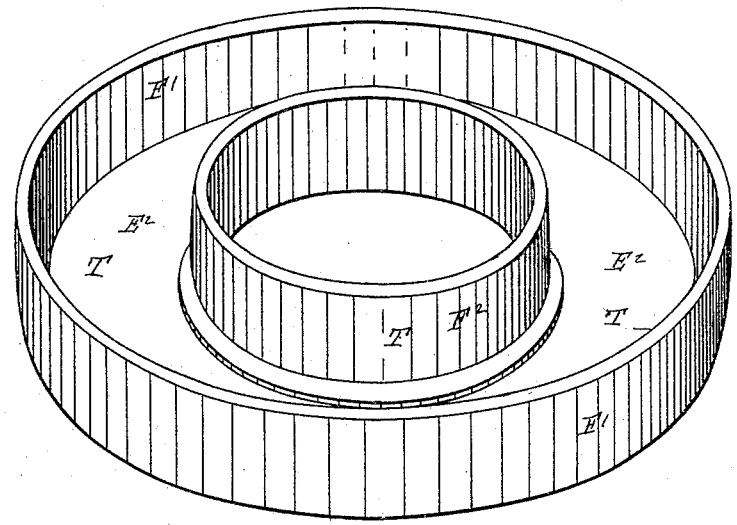

Of the illustrations, Figure 1 is a central longitudinal section taken through the bearing-box and rings, with the axle, two of the rollers, the end-thrust ball and separators shown in side elevation. Fig. 2 is a cross-section taken on the line $x^2\ x^2$ of Fig. 1. Fig. 3 is another cross-section taken on the line $x^3\ x^3$ of Fig. 1. Fig. 4 is a cross-section taken on the line $x'\ x'$ of Fig. 1; and Fig. 5 is a perspective of one of the inside tracks, shown as detached.

The several parts of the mechanism thus illustrated are designated by letter-reference, and the function of the parts is described as follows:

The letter A designates the axle; B, the bearing-box; C', the outer part of the two-part end cap E, and $C^2$ the inner part of the two-part end cap.

The letters R' designate the friction-rollers, which at each end are made with journals J, having a less diameter than the rollers proper. Each of these journals is made with an encircling groove $g'$, and $R^3$ a guide-ring at each end of the rollers encircling the journals of the rollers and separators, arranged to run in the annular grooves made in the latter.

The letters $R^2$ designate the separating rollers or equalizers, which are made to have a length that is a little less than the journals of the friction-rollers, and the letter $g^2$ designates an annular groove made in the circumferential face of the separators.

The letter G' designates a groove made in the outer cap part C', and G² a groove made in the inner cap part C², said groove parts G' and G² forming half of the annular passage P for the movement of the end-thrust ball B⁴.

The letter S designates a sleeve that is arranged within and upon the interior surface of the box B. This sleeve, as shown herein, is made to have the same length as the bearing-surface of the rollers R', as shown at Fig 1.

The letter R⁴ designates a sleeve-ring that is arranged at each end of the sleeve, so as to abut against the latter, and therefrom extended inwardly over but not in contact with the journals J. This ring is beveled off on its inner face at $b'$ to coincide with the bevel $b^2$ on the roller-shoulders, as shown at Fig. 1. Both the sleeve-rings and sleeve are secured to the box B.

The letter T designates the inner track, on which the separators or equalizers run. It has the form of an annular trough made with the end part E² and the flanges F' and F² projected therefrom at right angles thereto. The tracks at each end of the bearing are made alike, and are entered within the box, so that their flange edges approach each other, and so that the outer flange F² will abut against the adjacent sleeve-ring R⁴, while the inner flange F' will surround the axle A, so as not to be in contact therewith, but to form thereat an inside track for the separators to run upon.

The letter L designates a flange made of leather, which is arranged on the axle, and where projecting beyond the latter said flange runs in a groove U, made between the inner end of the box and the adjacent rear end face of the inside track. This leather flange acts as a dust-guard and to which no claim is made herein.

The outer end cap part of the bearing-box B (indicated at C') is made with the head H and encircling flange F⁴ and on its interior face with the annular recess $c^3$, the annular concavity $d^3$, and the circular recess $h^4$, the latter being for the reception of the head $h^5$ of the axle A. The inner cap part C² is made with the rim $r'$ corresponding in its diametrical area to that of the cap part C' with which it is adapted to connect by bolts $b^6$ and a flange F⁵ on the box, and this cap part C² is made with an outwardly-projected annular shoulder $d^5$, adapted to enter the annular recess $c^3$ of the other cap part, and this inner cap part is made with an annular concavity $d^2$, so that when the two cap parts are connected said concavity $d^2$, in connection with the annular concavity $d^3$ of the cap part C', forms one-half of the annular groove G', which, in combination with the annular groove G⁴, formed in the axle end, makes an annular passage P for the end-thrust ball B⁴. The sleeve-rings R⁴ as thus placed serve as an additional guard to keep the rollers R' in place and in alignment at their ends. The making of the inner end cap part C² without the inside track part (as in the older patent alluded to) conditions it in form, so that it can be made as a steel forging, thus making it stronger, and consequently more durable. The improved form given to the outer cap part C' also admits of its being made as a steel forging, which is of great advantage as regards wear and strength. The letter D designates an oil-duct, and K a plug therein adapted for the oiling of the device to prevent the rusting of the metal.

Having thus described our invention, what we claim, and desire to secure by Letters Patent, is—

1. The combination, with an axle provided with friction-rollers having end journals that are grooved circumferentially, and a separator made with an encircling groove and arranged to run on said journals, and an inner track between each two of said rollers at each end thereof, a ring arranged to encircle said separators, and journals at each end of the latter, substantially as described, of the bearing-box B, made with the interiorly-placed sleeve S, the latter having the same length as the rollers where engaging with the box, a ring R⁴, adapted to encircle the interior of said box, so as to abut against the sleeve at each end thereof and therefrom to project inwardly and lap past the ends of the rollers where having a larger diameter than the journals thereon, and the annular track T, made with the flanges F' F², constructed and arranged to operate substantially in the manner as and for the purposes set forth.

2. The combination, with the bearing-box B, made with the sleeve S, inside track T, rollers R', separators R³, and rings R⁴, of the axle A, made with the annular groove G⁴, the cap part C', made with the head H, flange F⁴ on its outer face, and the annular recess $c^3$, annular concavity $d^3$ on its inner face, and the cap part C², made with the rim $r'$, annular shoulder $d^5$, and annular concavity $d^2$, substantially in the manner as and for the purposes set forth.

Signed at Troy, New York, this 3d day of June, 1890, and in presence of the two witnesses whose names are hereto written.

CHARLES D. MENEELY.
JOHN GIBBONS.

Witnesses:
CHARLES S. BRINTNALL,
W. E. HAGAN.